United States Patent
Woodman et al.

(10) Patent No.: US 12,078,198 B2
(45) Date of Patent: Sep. 3, 2024

(54) METHOD AND APPARATUS FOR ATTACHING A TRAMPOLINE MAT TO A TRAMPOLINE FRAME

(71) Applicants: Plum Products Ltd, Ingham (GB); Design Office SARL, Lyons (FR)

(72) Inventors: David Woodman, Ingham (GB); Luke Denby, Ingham (GB); Joseph Mazoyer, Lyons (FR); Philippe Bajard, Lyons (FR)

(73) Assignee: PLUM PRODUCTS HOLDINGS PTY LTD, New South Wales (AU)

( * ) Notice: Subject to any disclaimer, the term of this patent is extended or adjusted under 35 U.S.C. 154(b) by 196 days.

(21) Appl. No.: 17/777,592

(22) PCT Filed: Nov. 18, 2020

(86) PCT No.: PCT/GB2020/000093
§ 371 (c)(1),
(2) Date: May 17, 2022

(87) PCT Pub. No.: WO2021/099753
PCT Pub. Date: May 27, 2021

(65) Prior Publication Data
US 2022/0397139 A1    Dec. 15, 2022

(30) Foreign Application Priority Data
Nov. 18, 2019 (GB) .................................. 1916789

(51) Int. Cl.
*F16B 2/20* (2006.01)
*A63B 5/11* (2006.01)

(52) U.S. Cl.
CPC . *F16B 2/20* (2013.01); *A63B 5/11* (2013.01)

(58) Field of Classification Search
CPC ......... F16B 2/20; A63B 5/11; A63B 21/0552; A63B 21/0557; A63B 71/022
See application file for complete search history.

(56) References Cited

U.S. PATENT DOCUMENTS

| 6,543,094 B2 * | 4/2003 | D'Addario ............... H02G 3/26 |
| | | 24/459 |
| 9,289,637 B2 | 3/2016 | Publicover et al. |

(Continued)

FOREIGN PATENT DOCUMENTS

| CN | 201123975 | 10/2008 |
| CN | 207126015 U | 3/2018 |

(Continued)

*Primary Examiner* — David M Upchurch
(74) *Attorney, Agent, or Firm* — Rabin & Berdo, P.C.

(57) ABSTRACT

A method for attaching a trampoline jumping mat to a trampoline frame using a clip comprising an aperture and the clip further comprising a hook for attaching the clip to the trampoline frame. The method also using an elastic connector comprising a first portion and a second portion, the first portion comprising a loop, and the method comprising the steps of:
a. passing part of the elastic connector through the aperture in the clip;
b. attaching the clip to the frame using the hook;
c. passing the first portion of the elastic connector around both the hook and the frame;
d. passing the second portion of the elastic connector through the loop of the first portion of the connector; and
e. connecting the second portion of the elastic connector to the trampoline jumping mat.

A clip for attaching a trampoline jumping mat to a trampoline frame, the clip comprising: a hook for attaching the clip to the trampoline frame. The clip further comprising an aperture which enables an elastic connector to be passed (Continued)

through the aperture and around both the hook and the frame; and the clip further comprising a fastener to which the elastic connector and/or a second elastic connector can be fastened.

13 Claims, 7 Drawing Sheets

(56) References Cited

U.S. PATENT DOCUMENTS

| | | | |
|---|---|---|---|
| 10,532,238 B2* | 1/2020 | Publicover | A63B 5/11 |
| 10,648,535 B2* | 5/2020 | LeBeau | F16G 11/101 |
| 10,989,275 B2* | 4/2021 | Mehr | A63B 5/11 |
| D920,458 S * | 5/2021 | Zeng | D21/797 |
| 11,167,165 B2* | 11/2021 | Publicover | A63B 21/0557 |
| 2008/0016659 A1 | 1/2008 | Peterson | |
| 2013/0316876 A1* | 11/2013 | Publicover | A63B 5/11 482/27 |
| 2016/0310774 A1* | 10/2016 | Publicover | A63B 5/11 |
| 2019/0143164 A1* | 5/2019 | Bisang | A63B 5/11 482/27 |
| 2019/0154115 A1* | 5/2019 | Mehr | A63B 5/11 |
| 2020/0023224 A1* | 1/2020 | Publicover | A63B 21/02 |
| 2020/0338380 A1 | 10/2020 | Chen | |

FOREIGN PATENT DOCUMENTS

| | | |
|---|---|---|
| CN | 109432689 A | 3/2019 |
| CN | 110787405 A | 2/2020 |
| EP | 3246495 A1 | 11/2017 |
| EP | 3466496 A1 | 4/2019 |
| WO | 2008083614 A1 | 7/2008 |
| WO | 2017191119 A1 | 11/2017 |
| WO | 2018081836 A1 | 5/2018 |

* cited by examiner

METHOD AND APPARATUS FOR ATTACHING A TRAMPOLINE MAT TO A TRAMPOLINE FRAME

This disclosure relates to apparatus for attaching a trampoline jumping mat to a trampoline frame, and a method for attaching a trampoline jumping mat to a trampoline frame.

Trampolines are a well known type of play apparatus that comprise a jumping mat attached to a trampoline frame with a biasing means that holds the jumping mat under tension. Historically, helical springs have been used, but recently some trampolines, in particular mini trampolines, have been provided with mats held under tension by other means such as one or more bungee cords. The trampoline industry has found that in some configurations bungee cords have advantages over trampolines with metal springs, helical springs, fibre rods or leaf springs. Additionally, although the toy safety standard EN71 does not distinguish between different types of springs vs elastic connectors such as bungee cords, some end users have a preference for bungee cords or elastic connectors over traditional springs. However, until now bungee cords, even individual bungee cords, are frustrating to use to assemble a trampoline, and in particular for larger trampolines, it is extremely difficult to obtain the required tension in the jumping mat.

Requiring each individual bungee cord to be knotted is fiddly, and it is at best extremely difficult for an adult to tie bungee cords when they are stretched to provide adequate tension for the jumping surface of the trampoline, even for mini trampolines of the "rebounder" category, which do not require as high a tension as larger trampolines. For larger trampolines, the difficulty increases.

The present disclosure results from Applicant's work seeking to provide improved apparatus for and methods for safely attaching a trampoline jumping mat to a trampoline frame in a manner that is both simple and safe for the person or persons assembling the trampoline, and for persons replacing parts or maintaining the trampoline, and which also results in an enjoyable jumping experience for persons jumping on the trampoline. In particular, this development is relevant to the use of elastic connectors such as bungee cords even in larger trampolines.

According to a first aspect of this disclosure, we provide a method for attaching a trampoline jumping mat to a trampoline frame using:
- a clip comprising an aperture, the clip further comprising a hook for attaching the clip to the trampoline frame;
- and an elastic connector comprising a first portion and a second portion, the first portion comprising a loop;

the method comprising the steps of:
- a. passing part of the elastic connector through the aperture in the clip;
- b. attaching the clip to the frame using the hook;
- c. passing the first portion of the elastic connector around both the hook and the frame;
- d. passing the second portion of the elastic connector through the loop of the first portion of the connector; and
- e. connecting the second portion of the elastic connector to the trampoline jumping mat.

Preferably, step a is carried out before step b, but alternatively step b could be carried out before step a. Step e may comprise attaching the second portion of the elastic connector to the jumping mat in any suitable manner, including but not limited to: directly connecting the connector to the mat; and looping the connector through an opening in the mat and then connecting the connector to the clip; or and looping the connector through an opening in the mat and then connecting the connector to the connector itself. Optionally, the elastic connector is passed between the mat and the frame a plurality of times before the connector is connected to the mat; or to the clip, or to the connector itself.

Preferably, the trampoline jumping mat comprises an opening, and step e comprises the substeps:
- e. i. passing the second portion of the elastic connector through the opening in the trampoline jumping mat; and
- e. ii. attaching the second portion of the elastic connector to the clip.

It will be understood that the more times an elastic connector is passed between the frame and the mat the more the elastic connector will be stretched, causing it to provide greater tension to the mat. According to this embodiment of the present method, step e comprises one or more sub-steps between e. i. and e. ii., in which the elastic connector is passed between the frame and the mat a plurality of times.

More preferably, the second portion of the elastic connector comprises a second loop, and the clip comprises a protrusion, and step e. ii. comprises: passing the second loop of the elastic connector around the protrusion of the clip. It will be understood that step a. of the above method could be carried out well in advance of an end user assembling a trampoline, by providing the end user with a clip that already has an elastic connector passed through it.

The elastic connector may comprise a single loop of elastics material, optionally including a knot or other suitable fastening, in which one part of the single loop is considered to be the first portion and another part of the single loop is considered to be the second portion. The elastic connector may comprise a first loop and a second loop formed from two separate pieces of elastics material and connected by a knot, or by any other suitable means. The elastic connector may comprise a single length of elastic material that is folded, in which the folded portion of the elastic connector is the first portion of the elastic connector, and in which the one or both of the ends of the elastic material is the second portion of the elastic connector. Preferably, the method is repeated with a plurality of clips and a plurality of elastic connectors.

According to a second aspect of this disclosure, there is provided a method for assembling a trampoline, the method comprising: attaching a trampoline jumping mat to a trampoline frame according to any of the above methods.

According to a third aspect of this disclosure, there is provided a clip for attaching a trampoline jumping mat to a trampoline frame, the clip comprising: a hook for attaching the clip to the trampoline frame; the clip further comprising; an aperture which enables an elastic connector to be passed through the aperture and around both the hook and the frame; and the clip further comprising a fastener to which the elastic connector and/or a second elastic connector can be fastened.

Preferred embodiments of the above clip have one or more of the following features: The fastener is a protrusion around which a portion of an elastic connector can be looped. The clip is made from one or more of: nylon, acetal, polypropylene, high impact polystyrene, polyethylene (in particular low-density polyethylene (LDPE) or high-density polyethylene (HDPE)), or acrylonitrile butadiene styrene (ABS). Most preferably the clip is made from nylon. The clip is moulded, more preferably the clip is injection moulded. The clip is 3D printed. The hook of the clip comprises a groove for holding an elastic connector in a preferred position. The groove is positioned adjacent to the aperture. The groove comprises two or more sub-grooves, each sub-groove being arranged to hold a portion of an elastic connector in a preferred position. The clip is formed in one piece. The hook is shaped to cooperate with the frame of the trampoline.

According to a fourth aspect of this disclosure, there is provided a kit for attaching a trampoline jumping mat to a trampoline frame, the kit comprising a clip according to any of the above aspects, and an elastic connector for use with the clip.

According to a fifth aspect of this disclosure, there is provided a trampoline comprising a clip according to any of the above aspects.

Preferred embodiments of apparatus for and methods for safely attaching a trampoline jumping mat to a trampoline frame in accordance with our teachings are described hereinbelow by way of example only with reference to the accompanying drawings in which.

Figure 1:
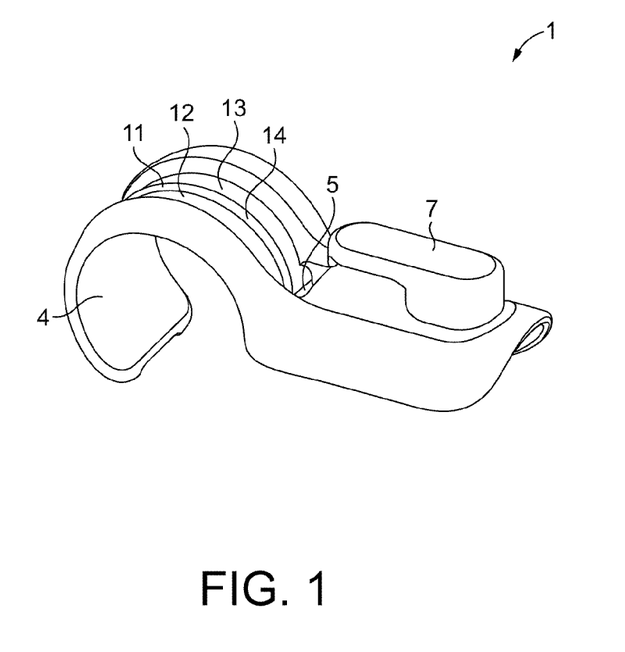
FIG. 1 is a perspective view of a clip for attaching a trampoline jumping mat to a trampoline frame.
Figure 2:
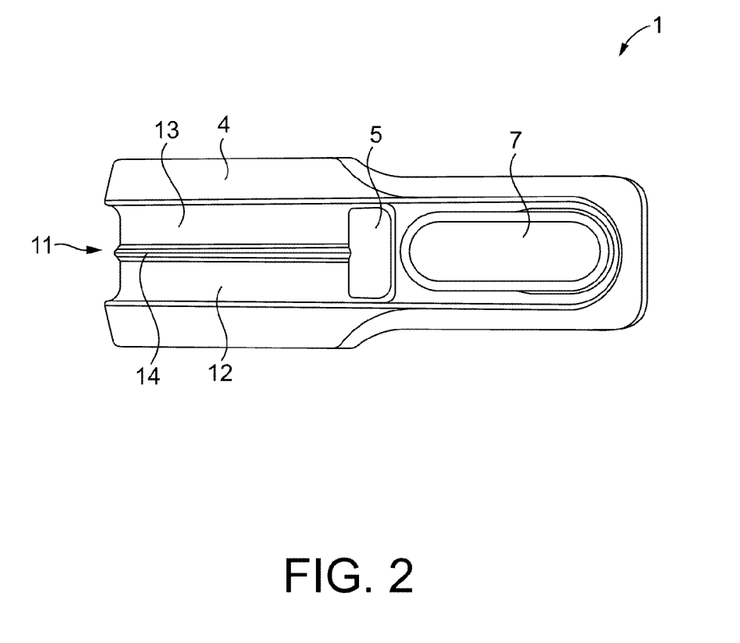
FIG. 2 is a top view of the clip of FIG. 1.
Figure 3:
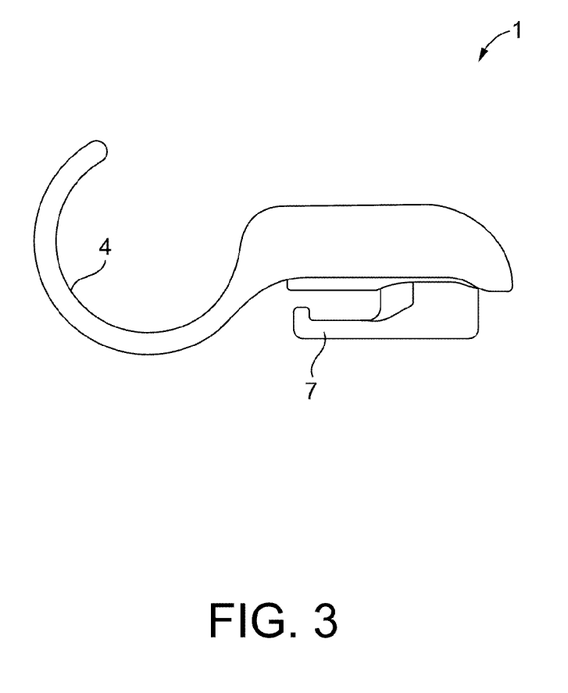
FIG. 3 is a side view of the clip of FIG. 1.

FIGS. 1-3 show a preferred embodiment of a clip 1 for attaching a trampoline jumping mat 2 to a trampoline frame 3. Clip 1 has a hook 4 for attaching clip 1 to a trampoline frame 3 according to the method depicted in FIGS. 4A-4E. Clip 1 also includes an aperture 5 which enables an elastic connector 6 to be passed through the aperture 5 and around both the hook 4 and the frame 3 of a trampoline. Clip 1 further comprises a fastener 7 to which the elastic connector 6 be fastened. As shown in the Figures, in the preferred embodiment of clip 1, fastener 7 is a protrusion around which a loop of elastic connector 6 can be looped.

Figure 4A:
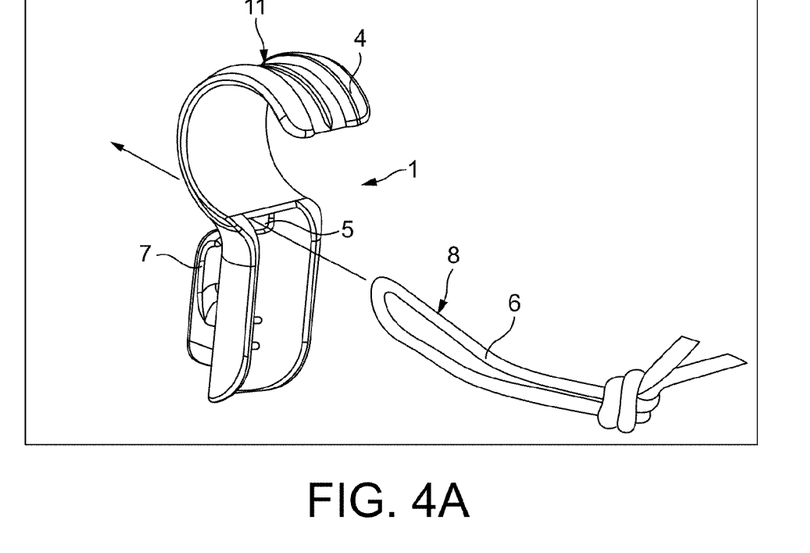
FIGS. 4A-4E illustrate a method for attaching a trampoline jumping mat to a trampoline frame.

A preferred method for attaching a trampoline jumping mat to a trampoline frame is depicted in FIGS. 4A-4E, using a clip 1 comprising an aperture 5, the clip 1 further comprising a hook 4 for attaching the clip 1 to the trampoline frame 3; and an elastic connector 6, which in Applicant's preferred embodiment is a bungee cord, comprising a first portion 8 and a second portion 9, the first portion 8 comprising a loop. FIG. 4A depicts the method step of passing part of the elastic connector 6 through the aperture 5 in the clip 1. In Applicant's preferred embodiment, it is the first portion 8, which comprises a loop, of the elastic connector 6 which is passed through aperture 3, but it will be appreciated that in alternative embodiments the second portion could be passed through aperture 3. The method step of attaching the clip 1 to the frame 3 using the hook 4 is not shown, but it will be appreciated that hook 4 can simply be hooked over frame 3.

Figure 4B:
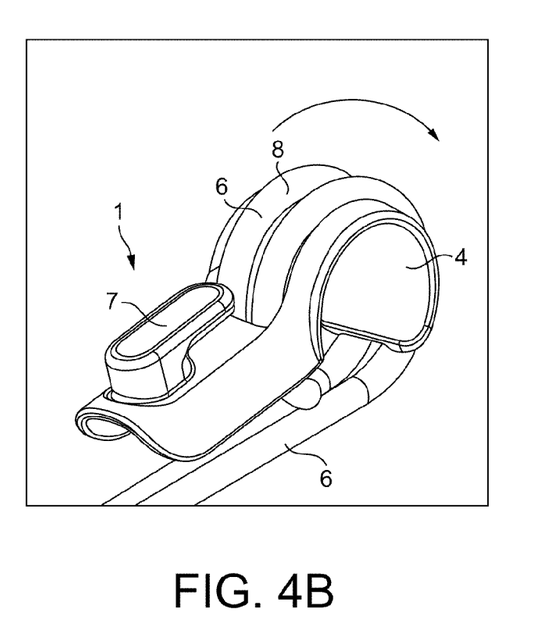
Figure 4C:
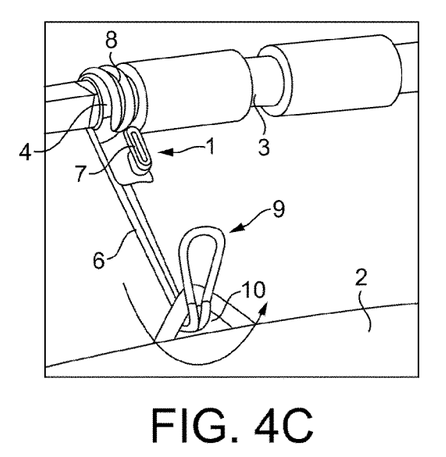
Figure 4D:
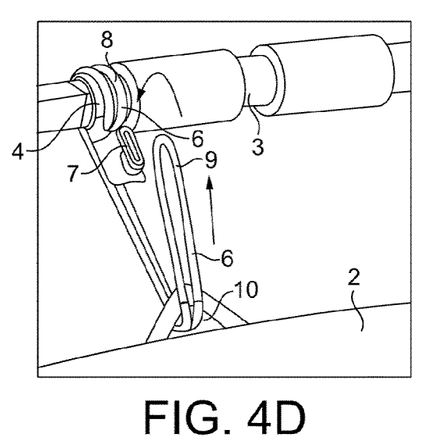
Figure 4E:
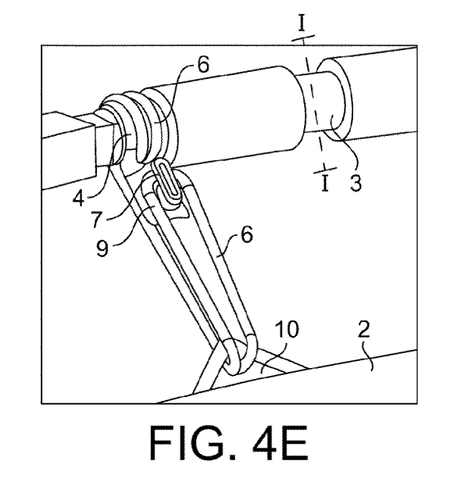
Figure 4F:
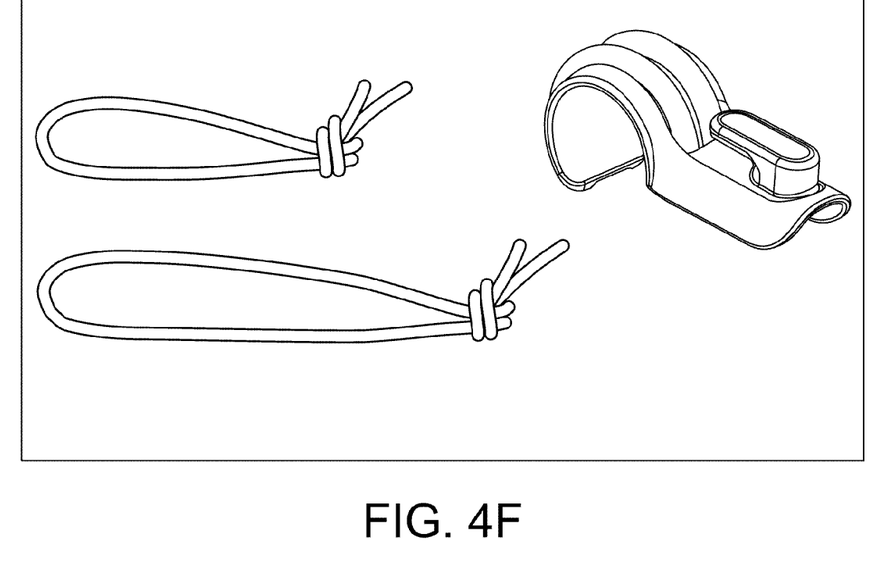

The trampoline frame partially shown in FIGS. 4C-E has a generally circular cross section as shown at section I-I, and hook 4 is shaped to accommodate part of frame 3. It is generally preferred that trampolines have a circular cross section for their frames, but where a clip is required to attach a jumping mat to the frame of a trampoline with a frame having a cross section other than circular, the shape of the hook could be adjusted to co-operate with the shape of the frame. "Co-operate" does not mean that the general shape of the hook has to match the cross section of the frame, it only needs to be functionally compatible with the frame with which it is intended to be used.

FIG. 4B shows the immediate result of method steps c and d. First portion 8 of elastic connector 6 has been passed around both hook 4 and frame 3. The second portion 9 of elastic connector 6 has been passed through first portion (loop) 8, and second portion 9 is then connected to the trampoline jumping mat 2, as shown in FIGS. 4C-4E. In this preferred embodiment, second portion 9 of elastic connector 6 also comprises a loop, the trampoline mat comprises an opening 10, and connection to the jumping mat 2 is achieved by passing the second portion 9 of the elastic connector 6 through the opening 10 in the trampoline jumping mat 2, and attaching the second portion 9, a loop in this embodiment, of the elastic connector to the clip 1 by looping second portion 9 around a protrusion which is a fastener 7.

In alternative embodiments, second portion 9 of elastic connector 6 may not include a loop. The first portion and/or the second portion 9 may comprise non-elastic components. In alternative embodiments fastener 7 of clip 1 may not be a protrusion, or fastener 7 may not be present. The second portion of elastic connector 6 may connect the clip to the jumping mat in any suitable manner, which may include, by way of non-limiting example: second portion being looped through an opening in or attached to the jumping mat and knotted or otherwise affixed to itself or to the mat or to the loop; the second portion being adhered or otherwise affixed to the jumping mat directly or indirectly, and temporarily or permanently; the second portion being looped through an opening in or attached to the jumping mat and being connected back to the clip in any suitable manner. The connector may be passed between the mat and the frame any number of times before being connected to the clip, the mat, or to a part of the connector itself.

The elastic connector may comprise a single loop of elastics material, optionally including a knot or other suitable fastening, in which one part of the single loop is considered to be the first portion and another part of the single loop is considered to be the second portion, as shown in the figures. One particular benefit of this is that the knot can be positioned within the clip, reducing access to the knot, which provides benefits both to user safety and to the appearance of the trampoline. The elastic connector may comprise a first loop and a second loop formed from two separate pieces of elastics material and connected by a knot, or by any other suitable means. The elastic connector may comprise a single length of elastic material that is folded, in which the folded portion of the elastic connector is the first portion of the elastic connector, and in which the one or both of the ends of the elastic material is the second portion of the elastic connector. The elastic connector may comprise a knot or other component that is too big to pass through the aperture of the clip.

Clip 1 in Applicants preferred embodiment is made from nylon, but alternative materials, including but not limited to: acetal, polypropylene, high impact polystyrene, polyethylene (in particular low-density polyethylene (LDPE) or high-density polyethylene (HDPE)), or acrylonitrile butadiene styrene (ABS) would also be suitable. Clip 1 in Applicants preferred embodiment is injection moulded, but other manufacturing methods would be suitable, including 3D printing. Clip 1 in Applicants preferred embodiment has a groove 11 which helps to keep elastic connector 6 in the desired position, and prevent elastic connector 6 slipping off the hook 4. Groove 11 extends from a position adjacent to aperture 5. As the part of elastic connector 6 that is passed around the hook 4 of clip 1 has two bungee strands in the preferred embodiment, groove 11 has two sub-grooves 12 and 13 to receive one bungee strand in their preferred positions. Sub-grooves 12 and 13 are separated by a raised portion 14. It will be understood that more than one raised portion could be used to provide more than two sub-grooves.

It will be appreciated that although the above invention relates to a single point of attachment of a jumping mat of a trampoline to the frame of a trampoline, it will be preferable to have a plurality of points of attachment between the mat and the frame. Most preferably, each of the plurality of points of attachment is made by using a clip and a connector as described herein. Alternatively, where a plurality of points of attachment are desired between a jumping mat of and a frame of a trampoline, some but not all of the connections can be provided according to the method described herein or using clips as described herein. By way of non-limiting example, this could be the case when users want to replace a single connection on their trampoline without replacing other connections, or when there are two or more categories of connection between the jumping mat and the trampoline frame. For example, in a trampoline that requires connections both around the circumference of the jumping mat and also at points not on the circumference of the mat, different attachment means could be used to fulfil the different requirements of those different locations. For example, the present arrangement could preferentially be used in areas where children could accidentally come into contact with the connectors, and springs or bungees attached in an alternative manner could be used in areas where users, in particular children, would not be likely to come into contact with the connectors.

An advantage of providing clip(s) separately from connector(s) separately from both the mat and the frame is that this allows for individual parts to be replaced without requiring replacement of other parts. Additionally, Applicant's method of attaching a jumping mat to a frame allows an end user to attach the mat by pulling on a soft elastic connector, rather than pulling on the clip itself, as previous trampolines have suggested. Requiring an assembler to pull on the clip itself can result in assemblers getting their fingers trapped between the clip and the frame, or even in a clip being projected by the elastic if user error occurs. As Applicant's clip is safely hooked to the frame before the user has to stretch the elastic connector to connect the mat to the frame, there is no risk of the clip coming free and potentially injuring an assembler during assembly of the trampoline.

Figure 5:
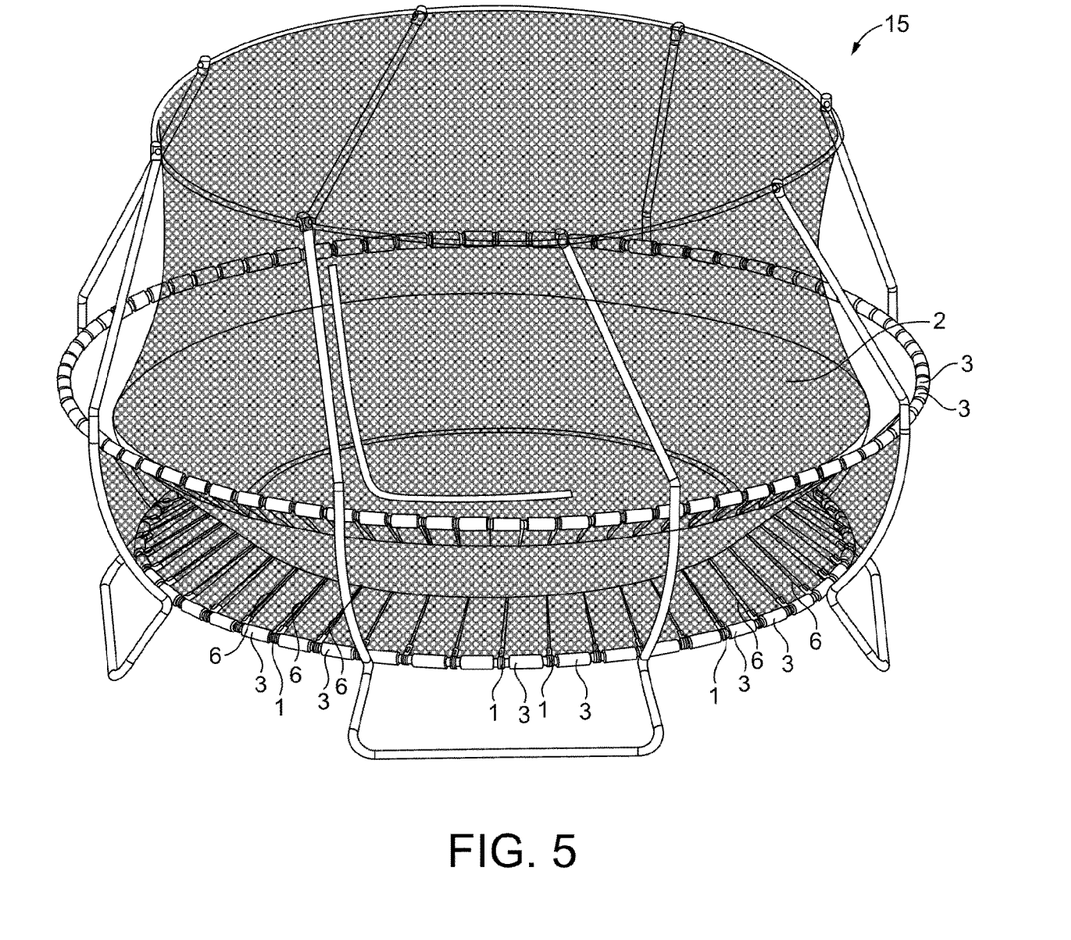
FIG. 5 shows a trampoline with a plurality of clips.

FIG. 5 shows a trampoline 15 that has its jumping mat 2 connected to its frame 3 by a plurality of clips 1 and elastic connectors 6. Although the trampoline shown in FIG. 5 has a generally circular footprint, together with a frustoconical mat and two rows of elastic connectors, it will be understood that clips according to the present invention, and a method for attaching a jumping mat to a trampoline frame according to the present invention can be used with trampolines of other shaped footprints, including but not limited to: square, oval, rectangular, etc., and with planar or non-planar jumping mats, and with any number of clips and connectors.

The invention claimed is:

1. A method for attaching a trampoline jumping mat to a trampoline frame using:
   a clip comprising an aperture, the clip further comprising a hook for attaching the clip to the trampoline frame; and an elastic connector comprising a first portion and a second portion, the first portion comprising a loop;
   the method comprising the steps of:
   a. passing part of the elastic connector through the aperture in the clip;
   b. attaching the clip to the frame using the hook;
   c. passing the first portion of the elastic connector around both the hook and the frame;
   d. passing the second portion of the elastic connector through the loop of the first portion of the connector; and
   e. connecting the second portion of the elastic connector to the trampoline jumping mat.

2. A method for attaching a trampoline jumping mat to a trampoline frame according to claim 1, wherein the trampoline jumping mat comprises an opening, and wherein method step e comprises the substeps:
   e. i. passing the second portion of the elastic connector through the opening in the trampoline jumping mat; and
   e. ii. attaching the second portion of the elastic connector to the clip and/or to the connector itself.

3. A method for attaching a trampoline jumping mat to a trampoline frame according to claim 1, wherein the second portion of the elastic connector comprises a second loop, and the clip comprises a protrusion, and step e. ii. comprises: passing the second loop of the elastic connector around the protrusion of the clip.

4. A method for attaching a trampoline jumping mat to a trampoline frame according to claim 1, wherein the elastic connector comprises a first loop and a second loop formed from two separate pieces of elastics material and connected by a knot.

5. A method for attaching a trampoline jumping mat to a trampoline frame according to claim 1, wherein the elastic connector comprises a single loop of elastics material, optionally including a knot or other suitable fastening, in which one part of the single loop is considered to be the first portion and another part of the single loop is considered to be the second portion.

6. A method for attaching a trampoline jumping mat to a trampoline frame according to claim 1, wherein the elastic connector is passed between the frame and the mat a plurality of times.

7. A method for assembling a trampoline, the method comprising: attaching a trampoline jumping mat to a trampoline frame according to the method of claim 1.

8. A method for attaching a trampoline jumping mat to a trampoline frame according to claim 2, wherein the second portion of the elastic connector comprises a second loop, and the clip comprises a protrusion, and step e. ii. comprises: passing the second loop of the elastic connector around the protrusion of the clip.

9. A method for attaching a trampoline jumping mat to a trampoline frame according to claim 2, wherein the elastic connector comprises a first loop and a second loop formed from two separate pieces of elastics material and connected by a knot.

10. A method for attaching a trampoline jumping mat to a trampoline frame according to claim 3, wherein the elastic connector comprises a first loop and a second loop formed from two separate pieces of elastics material and connected by a knot.

11. A method for attaching a trampoline jumping mat to a trampoline frame according to claim 2, wherein the elastic connector comprises a single loop of elastics material, optionally including a knot or other suitable fastening, in which one part of the single loop is considered to be the first portion and another part of the single loop is considered to be the second portion.

12. A method for attaching a trampoline jumping mat to a trampoline frame according to claim 3, wherein the elastic connector comprises a single loop of elastics material, optionally including a knot or other suitable fastening, in which one part of the single loop is considered to be the first portion and another part of the single loop is considered to be the second portion.

13. A method for attaching a trampoline jumping mat to a trampoline frame according to claim 2, wherein the elastic connector is passed between the frame and the mat a plurality of times.

\* \* \* \* \*